(12) United States Patent
Copty et al.

(10) Patent No.: US 10,798,075 B2
(45) Date of Patent: Oct. 6, 2020

(54) INTERFACE LAYER OBFUSCATION AND USAGE THEREOF

(71) Applicant: International Business Machines Corporation, Armonk, NY (US)

(72) Inventors: Fady Copty, Nazareth (IL); Ayman Jarrous, Shafa-amer (IL); Ronen Levy, Haifa (IL); Sharon Keidar Barner, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 242 days.

(21) Appl. No.: 15/881,810

(22) Filed: Jan. 29, 2018

(65) Prior Publication Data

US 2019/0238524 A1    Aug. 1, 2019

(51) Int. Cl.
*H04W 12/06* (2009.01)
*H04L 29/06* (2006.01)
(Continued)

(52) U.S. Cl.
CPC .......... *H04L 63/062* (2013.01); *H04L 9/083* (2013.01); *H04L 9/0838* (2013.01);
(Continued)

(58) Field of Classification Search
CPC . G06F 21/602; G06F 3/0622; G06Q 20/4097; H04L 2209/16; H04L 2209/805;
(Continued)

(56) References Cited

U.S. PATENT DOCUMENTS 7,065,210 B1 * 6/2006 Tsujii .................. H04L 9/083
                                                    380/259
9,479,485 B2   10/2016 Chen
(Continued)

FOREIGN PATENT DOCUMENTS

CN        103139058        6/2013
WO        2017066016       4/2017

OTHER PUBLICATIONS

Marc Fyrbiak, Hybrid Obfuscation to Protect Against Disclosure Attacks on Embedded Microprocessors, IEEE Transactions on Computers (vol. 67, Issue: 3, pp. 307-321) (Year: 2017).*
(Continued)

*Primary Examiner* — Luu T Pham
*Assistant Examiner* — Chao Wang
(74) *Attorney, Agent, or Firm* — Ziv Glazberg (57) ABSTRACT

A system, an apparatus, a computer program product and a method for obfuscation-based security and authentication. The method comprises: obtaining a different key for each different device; obfuscating an interface layer utilized by components of the device to interact, using the key, to produce an obfuscated interface layer; and providing, directly or indirectly, the two components with the key to allow the two components to utilize the obfuscated interface layer to interact with each other. The system comprises a plurality of devices that are instances of a same device and a server coupled to a memory retaining a plurality of keys, each of which is used to obfuscate interface layers of a different device to produce heterogeneous set of devices instead of a homogenous set of devices. Communications and operations with the plurality of devices are performed in an obfuscated manner through the server.

19 Claims, 6 Drawing Sheets

(51) Int. Cl.
*H04L 9/08* (2006.01)
*H04L 9/32* (2006.01)

(52) U.S. Cl.
CPC .......... *H04L 9/0861* (2013.01); *H04L 9/3271* (2013.01); *H04L 63/0428* (2013.01); *H04W 12/06* (2013.01); *H04L 2209/16* (2013.01); *H04L 2209/805* (2013.01)

(58) Field of Classification Search
CPC ..... H04L 9/0894; H04L 9/083; H04L 9/0838; H04L 9/085; H04L 9/0861; H04L 9/0869; H04L 9/088; H04L 9/3271; H04L 63/0428; H04L 63/062; H04W 12/06
See application file for complete search history.

(56) References Cited

U.S. PATENT DOCUMENTS

| | | | | |
|---|---|---|---|---|
| 2006/0053288 | A1* | 3/2006 | Stern | H04L 9/0844 |
| | | | | 713/168 |
| 2009/0129599 | A1* | 5/2009 | Garcia | H04L 63/105 |
| | | | | 380/279 |
| 2012/0011360 | A1* | 1/2012 | Engels | H04L 9/006 |
| | | | | 713/166 |
| 2016/0012212 | A1 | 1/2016 | Moritz et al. | |
| 2017/0083459 | A1* | 3/2017 | Riou | G06F 12/1466 |
| 2018/0115528 | A1* | 4/2018 | Rotvold | H04W 12/0808 |
| 2018/0198876 | A1* | 7/2018 | Ma | H04L 67/22 |
| 2018/0241760 | A1* | 8/2018 | Stephens | H04L 63/0281 |
| 2019/0005375 | A1* | 1/2019 | Mody | G06N 3/04 |
| 2019/0073373 | A1* | 3/2019 | Surale | H04L 12/4633 |

OTHER PUBLICATIONS

Sebastian Banescu, A Framework for Measuring Software Obfuscation Resilience against Automated Attacks, 2015 IEEE/ACM 1st International Workshop on Software Protection (pp. 45-51) (Year: 2015).*

Nektarios Georgios Tsoutsos, Obfuscated arbitrary computation using cryptographic primitives, 2015 10th International Design & Test Symposium (IDT) (pp. 5-8) (Year: 2015).*

Portokalidis et al., "Global ISR: Toward a Comprehensive Defense Against Unauthorized Code Execution", Moving Target Defense, Advances in Information Security, 2011, pp. 49-76, vol. 54. Springer, New York, NY.

* cited by examiner

INTERFACE LAYER OBFUSCATION AND USAGE THEREOF

TECHNICAL FIELD

The present disclosure relates to security and authentication methods in computerized systems in general, and to obfuscation-based security and authentication methods, in particular.

BACKGROUND

The Internet of things (IoT) is the network of physical devices, vehicles, home appliances, or other items embedded with electronics, software, sensors, actuators, and network connectivity, which enable these objects to connect and exchange data. Each "thing" is uniquely identifiable through its embedded computing system but is able to inter-operate within the existing Internet infrastructure.

The IoT allows objects to be sensed or controlled remotely across existing network infrastructure, creating opportunities for more direct integration of the physical world into computer-based systems, and resulting in improved efficiency, accuracy and economic benefit in addition to reduced human intervention. When IoT is augmented with sensors and actuators, the technology becomes an instance of the more general class of cyber-physical systems, which also encompasses technologies such as smart grids, virtual power plants, smart homes, intelligent transportation and smart cities. These devices collect useful data with the help of various existing technologies and then autonomously flow the data between other devices.

IoT is being developed rapidly, and so are the profound security challenges involved. Experts estimate that the IoT will consist of tens of billions objects by 2020. Most of the technical security issues are similar to those of conventional servers, workstations and smartphones, but the firewall, security update and anti-malware systems used for those are generally unsuitable for the much smaller, less capable, IoT devices. In particular, as the Internet of things spreads widely, cyber-attacks are likely to become an increasingly physical and virtual threat.

BRIEF SUMMARY

One exemplary embodiment of the disclosed subject matter is a method comprising: obtaining a key for a device, whereby different keys are obtained for different devices, wherein the device is configured to execute a computer program product, wherein the device is configured to execute two components, wherein at least one of the two components is part of the computer program product, wherein the two components are configured to interact with each other via an interface layer; obfuscating the interface layer using the key, whereby producing an obfuscated interface layer; and providing, directly or indirectly, the two components with the key to allow the two components to utilize the obfuscated interface layer to interact with each other.

Another exemplary embodiment of the disclosed subject matter is a system comprising: a server, wherein said server is coupled to a memory retaining a plurality of keys, wherein each key is associated with a different device of a plurality of devices; and said plurality of devices is configured to communicate with said server; wherein each device of said plurality of devices is an instance of a same device, wherein the same device comprises an interface layer utilized when communicating with said server; wherein said each device comprises, instead of the interface layer, an obfuscated interface layer that is obfuscated using a key comprised by the plurality of keys and that is associated with said each device, whereby providing a heterogeneous set of devices instead of a homogenous set of devices, wherein said server is configured to communicate with a second device of the plurality of devices by retrieving a second key associated with said second device from said memory and obfuscating communication using said second key to generate a communication compatible with an obfuscated interface layer of said second device.

Yet another exemplary embodiment of the disclosed subject matter is a computer program product comprising a non-transitory computer readable storage medium retaining program instructions, which program instructions when read by a processor, cause the processor to perform a method comprising: obtaining a key for a device, whereby different keys are obtained for different devices, wherein the device is configured to execute a computer program product, wherein the device is configured to execute two components, wherein at least one of the two components is part of the computer program product, wherein the two components are configured to interact with each other via an interface layer; obfuscating the interface layer using the key, whereby producing an obfuscated interface layer; and providing, directly or indirectly, the two components with the key to allow the two components to utilize the obfuscated interface layer to interact with each other.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

One technical problem dealt with by the disclosed subject matter is preventing the execution of a malicious code or code injection on IoT devices, and providing for a security paradigm that is suitable for IoT devices.

Security issues related to IoT devices may set an obstacle to the penetration and growth of this field. One industrial effort of securing IoT may be focused around securing the IoT networking by monitoring the devices communication. Despite the efforts in securing network, in some cases, IoT devices may be easily compromised and network monitoring systems may be bypassed resulting in large scale disruption.

Many security attacks on IoT Networks, such as Mirai, BrickerBot malware, or the like, may illustrate the easiness in compromising IoT devices and the using of these compromised devices in disruptive distributed denial of service (DDoS) attacks. As an example, Mirai malware may turn networked IoT devices into remotely controlled bots that may be used as part of a botnet in large-scale network attacks.

Another challenge may be securing edge IoT devices to ensure the reliability of the running code thereon. Securing edge IoT devices may be challenging due to IoT market fragmentation and IoT heterogeneity. Variant instances of the same IoT device, may be spread in different locations. Based on attackers' knowledge of a system of the IoT device, such as by a reverse engineering; attackers may learn how to attack the IoT device and scale up the attack to all the other instances.

Additionally or alternatively, securing edge IoT devices may be challenging due to IoT device limitations of computing power, memory, storage, power consumption, or the like. Because of such limitations, advances security systems such as firewall, Mobile Secure Gateway (MSG), anti-viruses, endpoint protection, or the like, may be disabled of being operated on IoT devices.

Another technical problem dealt with by the disclosed subject matter is to provide a tool for IoT device authentication. IoT device authentication may be one of the most critical issues that IoT management platforms face. Without IoT identity and authentication management, platforms may not be able to control IoT identity, which could cause mistrust between the platform and the IoT devices. Cryptographic based solution and authentication management may not suited to IoT limitations. As such solutions may require the IoT device to encrypt and decrypt each communication performed by the device before performing thereof. The encryption and decryption may demand great amounts of energy, time and space.

One technical solution is to create a heterogeneous set of IoT devices instead of a homogeneous set of IoT devices, by obfuscating interface layers utilized by the IoT device to intermediate between different components. In some exemplary embodiments, a homogeneous set of IoT devices may comprise a plurality of IoT devices, each of which is an instance of a same IoT Device. Obfuscating the interface layers may be performed differently in each IoT device, turning each IoT device different than the others. The proposed solution may prevent attackers from scaling their knowledge of one IoT device to attack another IoT device. The obfuscation may be performed on a plurality of interface layers of the IoT device using different keys for different interface layers.

In some exemplary embodiments, IoT devices may be configured to execute computer program products. Components of such computer program products, such as applications, functions, software modules, or the like, may be configured to interact with each other, or with other components executed by the device or external thereto, via interface layers.

In some exemplary embodiments, the interface layer may be an Instruction Set Architecture (ISA). The ISA may serve as an interface between software components and hardware components of the device. The ISA may comprise a set of machine instructions used for the communication between software components or operating system and hardware components, such as Central Processing Unit (CPU) of the device. As an example, the machine instructions may comprise data handling and memory operations, such as instructions for setting values to registers, copying data from memory, register load and store operations, instructions to read or write data from hardware devices, or the like. The instructions may be executed directly by the CPU.

Additionally or alternatively, the interface layer may comprise functions of an operating system of the device. Functions of the operating system may provide an interface between a process and the operating system. As an example, functions of the operating system may be system call executed by computer programs to request a service from the kernel of the operating system that computer programs are executed on. Such services may include hardware-related services, such as accessing a hard disk drive, creation and execution of new processes, communication with integral kernel services such as process scheduling, or the like.

Additionally or alternatively, the interface layer may be an Application Programing Interface (API). The API may be a set of defined methods of communication between various software components. An API may be used to interface components of a web-based system, operating system, database system, computer hardware, software library, or the like. As an example, an API may specify the interface between an application of the device and the operating system. Additionally or alternatively, the API may specify the interface between components of the device and components external to the device, such as manipulating remote resources through protocols, invocation of functions that operate remotely, defining interactions between an enterprise and applications that use its assets, communications over a network, or the like.

In some exemplary embodiments, the interface layer may be a set of addresses of invocable gadgets. Invocable gadgets may be sequence of instructions, which may end with a return instruction. The invocable gadgets may be invoked using their address. The invocable gadgets may be invoked by the program which comprises them, or by injected code that applies Return-Oriented Programming (ROP) methods.

In some exemplary embodiments, each interface layer may be obfuscated using a unique key to produce an obfuscated interface layer. In some exemplary embodiments, the key may be unique to the IoT device, e.g., different devices may be associated with different keys. Additionally or alternatively, the key may be unique to the interface layer, e.g., different interface layers within the same IoT device may be obfuscated using different keys.

In some exemplary embodiments, the obfuscation may modify source or machine code of the interface layer, in a manner that a third party may not be able to understand. Like obfuscation in natural language, it may use needlessly roundabout expressions to compose statements. By obfuscating the code, its purpose may be concealed because of the obscurity of the code. Additionally or alternatively, logic or implicit values of the code may be embedded in the obfuscated code, in order to prevent tampering, deter reverse engineering, or the like.

In some exemplary embodiments, the obfuscation may be performed by keyword substitution, use or non-use of whitespace to create artistic effects, changing names of routines or variables, naming variables in a meaningless or deceptive way, double coding, or the like. As an example, obfuscating an ISA interface layer may be performed by obfuscating each instruction in the assembler ISA. The instructions may be obfuscated by mapping each instruction to a different instruction based on the key, changing the names of the instructions, or the like. A hypervisor, or a thin translation layer, that is configured to translate the obfuscated instructions before executing them on the CPU may be added.

In some exemplary embodiments, the key may be provided, directly or indirectly, to the components utilizing the interface layer, to allow the components to utilize the obfuscated interface layer to interact with each other. In some exemplary embodiments, the components utilizing the interface layer may be compiled with the obfuscated interface layer, thereby providing the key to the components in an indirect manner Additionally or alternatively, the components may be configured to retrieve the key and perform obfuscation or deobfuscation on the fly of the interface layer, in order to utilize the obfuscated interface layer. Referring to the previous example, the hypervisor may be provided with the key used to obfuscate the ISA interface layer. The hypervisor may be configured to deobfuscate each instruction using the key. The CPU may be configured to execute the deobfuscated instructions. Additionally or alternatively, the CPU may be replaced with an obfuscated CPU that is configured to execute the obfuscated ISA, compiled with the obfuscated ISA, or the like. The obfuscated CPU may be configured to execute obfuscated instructions directly as being transmitted via the obfuscated interface layer, without the need to retrieve the key or deobfuscate the instructions.

In some exemplary embodiments, a server may be configured to manage the obfuscated interface layers in the IoT devices. The server may be configured to communicate and manage several IoT devices. Each IoT device may be associated with at least one key that is used for the obfuscation of the interface layers thereof. In some exemplary embodiments, the server may be coupled to a memory that retains keys associated with the IoT devices. Different IoT devices may be associated with different keys.

In some exemplary embodiments, the IoT devices may be instances of a single device. In some cases, the different instances may be IoT devices of different manufacturer that implement the same protocols and act the same way. Such devices may also be considered as homogenous and an attack vector which is applicable to one instance may also be applicable to the other. The IoT devices may be configured to utilize the same interface layer to communicate with the server. The interface layer of each IoT device may be replaced with an obfuscated interface layer that may be unique for the IoT device. The obfuscated interface layer may be generated using the key that is associated with the IoT device.

In some exemplary embodiments, the server may be configured to communicate with each IoT device via the obfuscated interface layer. The server may be configured to use the key associated with the IoT device and obfuscate the communication with the IoT device using the key. The obfuscated communication may compatible with the obfuscated interface layer of the IoT device.

In some exemplary embodiments, the server may be configured to compile the obfuscated interface layer with the IoT device, in order to allow components of the IoT device to communicate via the obfuscated interface layer instead of the original interface layer. The server may be configured to modify a component of the IoT device to utilize the obfuscated interface layer instead of the original interface layer. The server may provide the modified component to the IoT device to allow obfuscated communication with the server. The modified component may be configured to execute obfuscated instructions provided via the obfuscated interface layer, read obfuscated payload of the communication provided via the obfuscated interface layer, or the like.

Another technical solution is to authenticate IoT devices using the obfuscated interface layers. In some exemplary embodiments, an authentication massage with program instructions utilizing one or more obfuscated interface layers may be sent to the device. A predetermined outcome may be expected upon executing the program instructions. The outcome of executing the program instructions by the device may be compared with the predetermined response. The device may be authenticated based on the outcome and the predetermined response being identical. Only obfuscated device with the appropriate key may be able invoke the program instructions and return the required result.

One technical effect of utilizing the disclosed subject matter is to prevent attackers from scaling their knowledge of one device to attack another device. The disclosed subject matter turns the homogenous devices into heterogeneous devices. As a result, knowledge of an attacker about one device cannot be scaled to build a malicious code that can run on other devices. Furthermore, the disclosed subject matter may prevent attackers from scaling their knowledge of an input-based device vulnerability. As the same input may be read differently in the other devices.

As yet another technical effect of utilizing the disclose subject matter is to enable a reliable IoT device authentication. Since on each request and communication with an IoT device, the platform may interact with a plurality of layers in the IoT device. As a result, a plurality of keys may be used resulting to authenticate each request, which leads to an enhance authentication.

The disclosed subject matter may provide for one or more technical improvements over any pre-existing technique and any technique that has previously become routine or conventional in the art. Additional technical problem, solution and effects may be apparent to a person of ordinary skill in the art in view of the present disclosure.

The present disclosure focuses on the non-limiting example of IoT devices, for clarity of explanation. However, the disclosed subject matter is not limited to such an embodiment, and can be applied on other, non-IoT devices.

Figure 1:
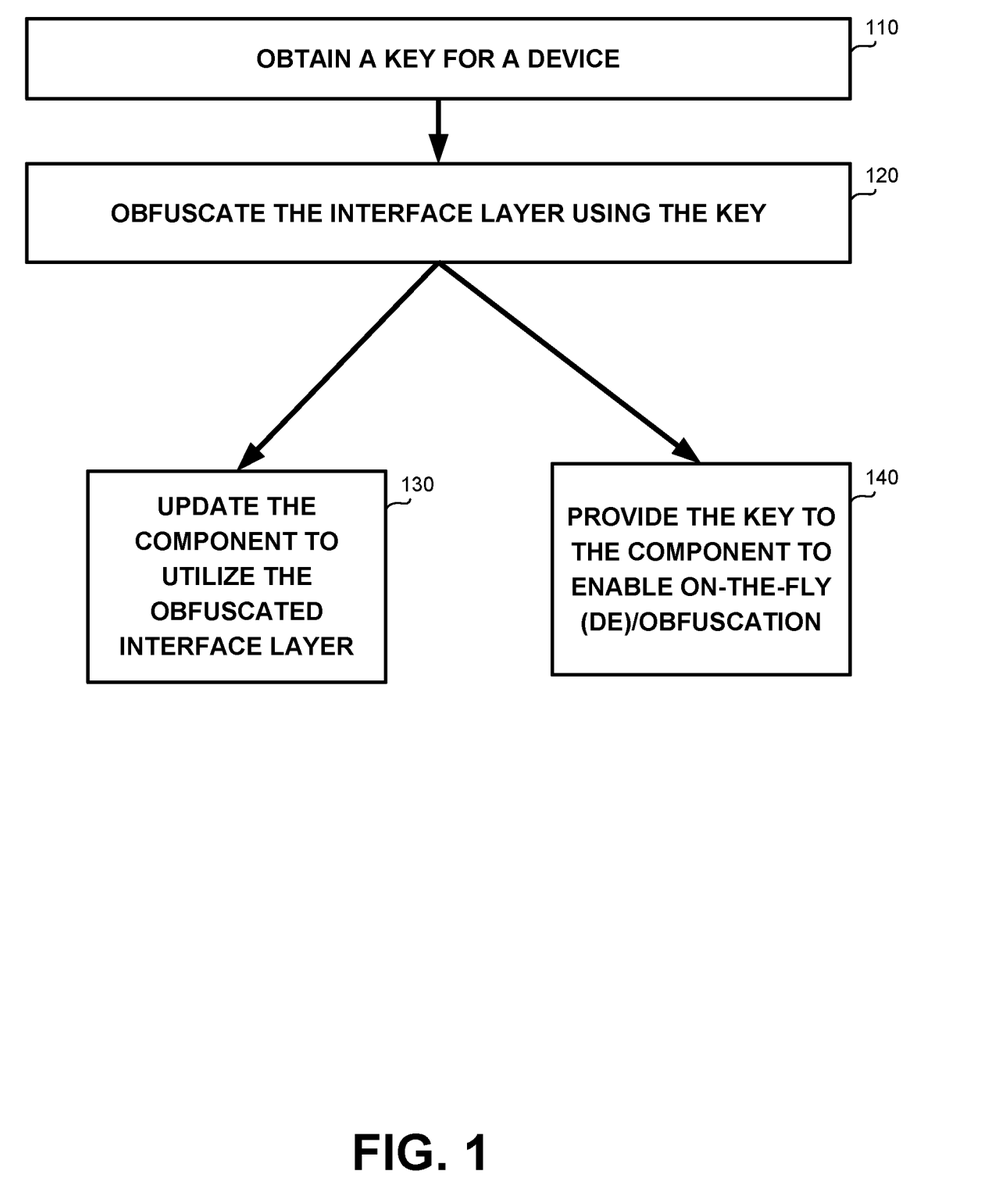
FIG. 1 shows a flowchart diagram of a method, in accordance with some exemplary embodiments of the disclosed subject matter.

Referring now to FIG. 1 showing a flowchart diagram of a method, in accordance with some exemplary embodiments of the disclosed subject matter.

On Step 110, a key may be obtained for a device. In some exemplary embodiments, the key may be unique for the device. Different keys may be obtained for different devices. In some exemplary embodiments, the device may be an IoT device. The IoT device may be computing device that connects wirelessly to a network and has the ability to transmit data, control another items, or the like.

In some exemplary embodiments, the key may be provided by a user or a manufacturer of the device. Additionally or alternatively, the key may be generated based on credential provides by the user, retrieved from a storage, or the like.

In some exemplary embodiments, two components may be configured to interact with each other via an interface layer. One of the components may be a software component executed by the device, e.g., part of a computer program product executed by the device. The other component may be another software component of another computer program product executed by the device, a software component executed by another device, a hardware component of the device, or the like.

As an example, the interface layer may be an ISA connecting between a software component, such as an operating system of the device, and a hardware component such as a processor of the device.

As another example, a first component may be a part of a computer program executed by the device and the second component may be external to the device. The first and the second components may be configured to communicate over a network. The first and the second components may be configured to interact with each other via an external API. It may be appreciated that the second component may be configured to communicate with other devices while utilizing a different key to communicate with each different device.

On Step 120, an interface layer may be obfuscated using the key. An obfuscated interface layer may be produced. In some exemplary embodiments, the obfuscated interface layer may be a modification of the interface layer. The modification may be generated by encrypting parts of the interface layer using the key, such as encrypting the functions names, inserting meaningless code, or the like.

As an example, the interface layer may be obfuscated by obfuscation of the function names in the interface layer. Code comprising the obfuscated functions names may be compiled on the server before being deployed on the device. As another example, ports utilized in the interface layer may be obfuscated. The ports may be obfuscated such as by using a permutation function on the port numbers. As yet another example, interface layers comprising external API of the device that may be used for communicating with other devices may be obfuscated. For instance, The external API may be obfuscated by using the request form 'http://<IoT IP>/user_<random>' instead of 'http://<IoT IP>/user', e.g., by adding a random text after the user agent identifier. The random text may be generated using the key. In some exemplary embodiments, the obfuscation may be an obfuscation of information in a header of a packet but without necessarily modifying or obfuscating the payload of the packet itself.

As another example, an interface layer comprising a set of address of invocable gadgets may be obfuscated by modifying the addresses. In some cases, Address Space Layout Randomization (ASLR) may be employed and effectively modify the addresses of the invocable gadgets. The addresses may be modified using the key, such as mathematically manipulated using the key to determine modified addresses thereof. In some exemplary embodiments, invocation of the obfuscated interface layer itself may be performed using the modified addresses. The component invoking the invocable gadgets may be modified and compiled to use the modified addresses. In some cases, addresses of invocable gadget in the modified code generated using ASLR may be translated to their original counterpart using the key.

In some exemplary embodiments, different interface layers of the device may be obfuscated differently, such as using different keys, different obfuscation methods, or the like. Additionally or alternatively, different interface layers of the device may be obfuscated using the same key.

In some exemplary embodiments, the interface layer may be obfuscated automatically, such as by an obfuscation software. The obfuscation software may be configured to utilize the key to obfuscate the interface layer.

In some exemplary embodiments, the components may be provided, directly or indirectly, with the key to allow the two components to utilize the obfuscated interface layer to interact with each other.

On Step 130, one or both of the two components may be updated to utilize the obfuscated interface layer. In some exemplary embodiments, the component may be compiled with the obfuscated interface layer. In such a case, the key may not necessarily be required to be provided directly to the component, as the obfuscation is embedded within the component. As an example, an obfuscation of the function names in the code running on the device may be performed by compiling the obfuscated code on the server and deploying it on the device. As a result, the device may be enabled to process obfuscated communications.

Additionally or alternatively, on Step 140, the key may be provided to one or both of the two components to enable on-the-fly obfuscation or deobfuscation. The component may be configured to perform obfuscation or deobfuscation on the fly of the interface layer, in order to be enabled to utilize the obfuscated interface layer. As an example, the obfuscation may be performed by encrypting instructions of the interface layer. The components may be provided with the key. On each execution of a series of instructions, the components may deobfuscate the instructions and then execute the deobfuscated instructions. In some exemplary embodiments, a translation layer may be added between the two components to intermediate the obfuscated communication therebetween. The key may be provided to the translation layer to enable the translation layer to deobfuscate the obfuscated communication provided from the first component before being transmitted to the second component.

Figure 2:
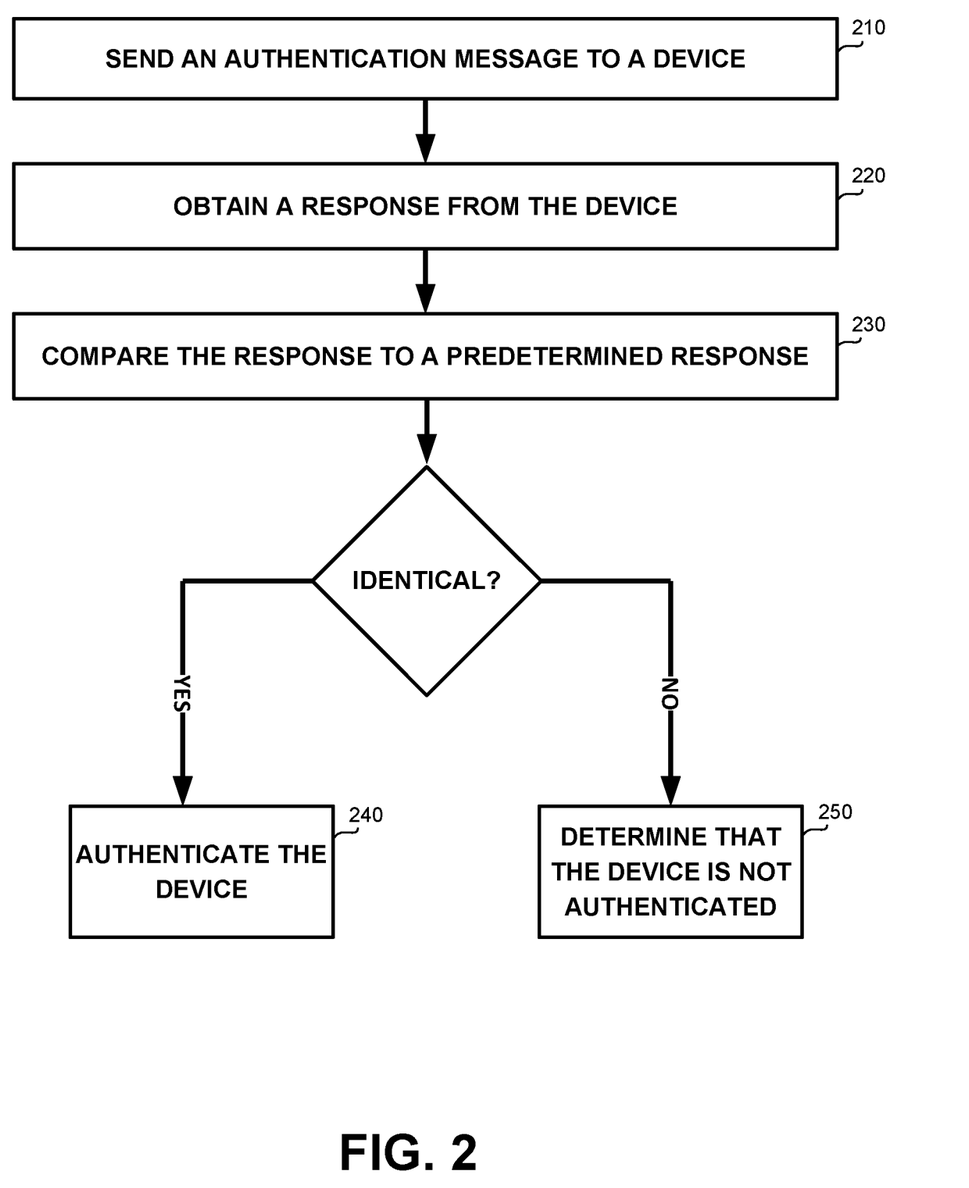
FIG. 2 shows a flowchart diagram of a method, in accordance with some exemplary embodiments of the disclosed subject matter.

Referring now to FIG. 2 showing a flowchart diagram of a method, in accordance with some exemplary embodiments of the disclosed subject matter.

On Step 210, an authentication message may be sent to a device. In some exemplary embodiments, the authentication massage may comprise program instructions utilizing an obfuscated interface layer of the device. A predetermined outcome may be expected upon executing the program instructions comprised by the authentication massage. The predetermined outcome may be obtained in accordance with the obfuscation of the obfuscated interface layer.

On Step 220, a response may be obtained from the device. In some exemplary embodiments, the response may comprise an outcome of executing the program instructions by the device.

On Step 230, the response may be compared to the predetermined response. In case the outcome and the predetermined outcome are identical, the device may be authenticated (Step 240). Otherwise, the device may be determined to be unauthorized. (Step 250)

As an example, the message may comprise obfuscated function names, that only devices with obfuscated interface layer that are obfuscated using the same key may return the correct value.

Figure 3A:
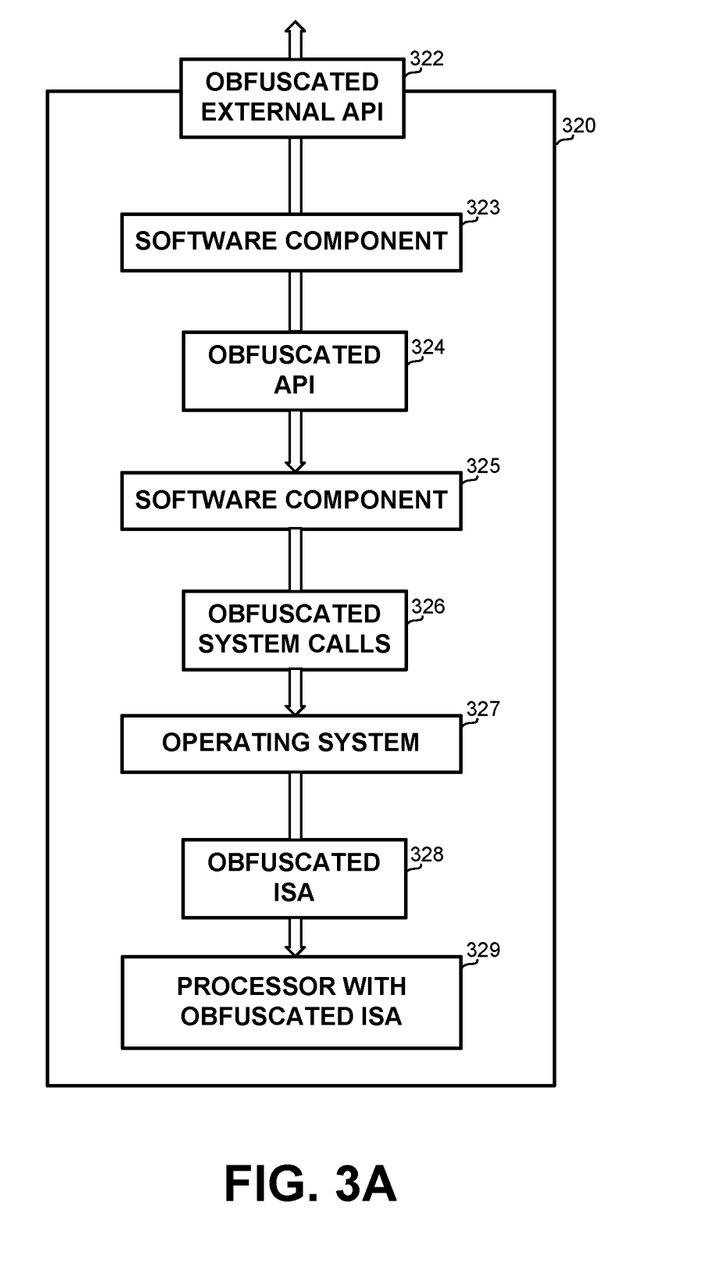
FIGS. 3A-3C show schematic illustrations of exemplary devices, in accordance with some exemplary embodiments of the disclosed subject matter.

Referring now to FIG. 3A showing a schematic illustration of an exemplary device, in accordance with some exemplary embodiments of the disclosed subject matter.

A Device 320 may be an IoT device. In some exemplary embodiments, Device 320 may be configured to execute variant components, such as software components, hardware components or the like. Each couple of components may be configured to interact with each other via an interface layer. As an example, Software Component 323 may be configured to interact with Software Component 325 via Obfuscated Interface Layer 324, and with components external to Device 320 (such as Server 310) via Obfuscated Interface Layer 322.

In some exemplary embodiments, each interface layer in Device 320 may be obfuscated using a key. In some exemplary embodiments, the key may be unique for Device 320 and may be utilized for obfuscating all the interface layers. Additionally or alternatively, a different key may be utilized for obfuscating each interface layer. The different key may be derived from the unique key of Device 320. In some exemplary embodiments, different keys may be randomly generated using a random number generator (RNG), pseudorandom number generator (PRNG), or the like.

As an example, Obfuscated Interface Layer 324 may be an obfuscated API and Obfuscated Interface Layer 322 may be an obfuscated external API. Both of the APIs may be obfuscated using the same key of Device 320. Additionally or alternatively, the obfuscated API of Obfuscated Interface Layer 324 may be obfuscated using a first key while the obfuscated external API of Obfuscated Interface Layer 322 may be obfuscated using a second key. Additionally or alternatively, the obfuscated API of Obfuscated Interface Layer 324 may be generated using a first method of obfuscation using the key of Device 320 and the obfuscated external API of Obfuscated Interface Layer 322 may be generated using a second method of obfuscation using the key of Device 320. As an example, the obfuscated external API of Obfuscated Interface Layer 322 may be obfuscated by replacing each http request "http://<IoT IP>/user" with "http://<IoT IP>/user_<random>". e.g., adding a random number or string after the user agent identifier. The random number or string may be generated using the key. While the obfuscated API of Obfuscated Interface Layer 324 may be obfuscated by adding a random extension to function names, that is generated using the key.

In some exemplary embodiments, each obfuscated interface layer may comprise a different interface type. As an example, Obfuscated Interface Layer 326 that intermediates between Software Component 325 and Operating System 327, may comprise obfuscated system calls. The obfuscated system calls may be obfuscated using the key associated with Device 320, a key associated with the Obfuscated Interface Layer 326, or the like. As another example, Operating System 327 may be configured to interact with Processor 329 of Device 320 via Obfuscated Interface Layer 328. Obfuscated Interface Layer 328 may comprise an obfuscated ISA.

In some exemplary embodiments, components that are configured to interact via the interface layer may be provided indirectly with the key used to obfuscate the interface layer, to allow the components to utilize the obfuscated interface layer to interact with each other. Components of Device 320 may be compiled according to the obfuscation of the interface layer utilized thereby for interaction. As an example, Processor 329 of Device 320 may be compiled with the obfuscated ISA used in Obfuscated Interface Layer 328. As a result, obfuscated instructions sent from Operating System 327 to Server 329, via Obfuscated Layer 328, may be directly processed and performed.

Figure 3B:
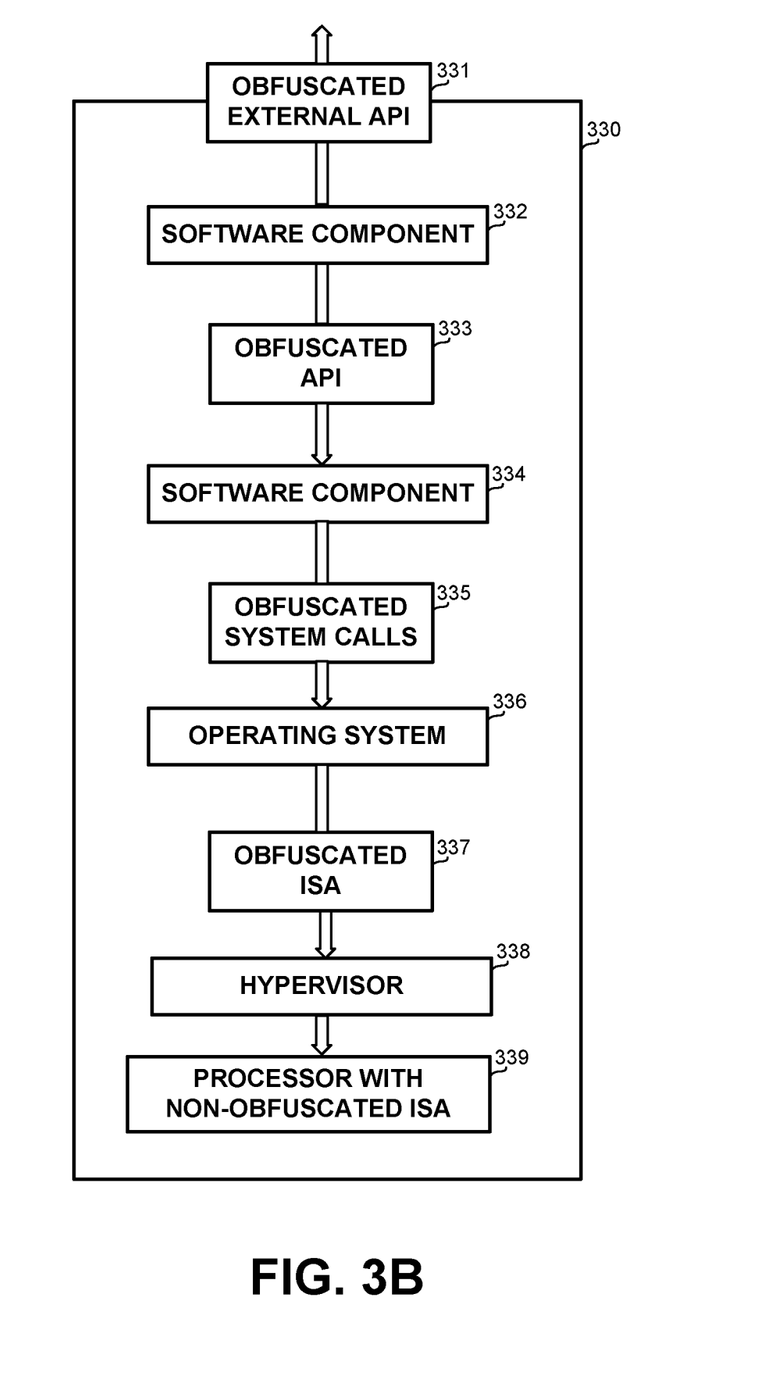

Referring now to FIG. 3B showing a schematic illustration of an exemplary device, in accordance with some exemplary embodiments of the disclosed subject matter.

A Device 330 may be an IoT device. Device 320 and Device 330 may be instances of the same device. Device 320 and Device 330 may be configured to execute the same components, such as Software Component 323 and Software Component 332, Software Component 325 and Software Component 334, Operating System 327 and Operating System 336, Processor 329 and Processor 339, or the like. Each couple of components in Device 330 may be configured to interact with each other via the same interface layer as in Device 320.

In some exemplary embodiments, each interface layer in Device 330 may be obfuscated using a key. The key(s) utilized to obfuscate the interface layers of Device 330 may be different than the key(s) utilized in the obfuscation of interface layers of Device 320.

Each interface layer in Device 330 may be replaced with an obfuscated interface layer. Components that are configured to interact via the interface layer may be provided, directly or indirectly, with the key used to obfuscate the interface layer, to allow the components to utilize the obfuscated interface layer to interact with each other. In some exemplary embodiments, components of Device 330 may be compiled according to the obfuscation of the interface layer utilized thereby for interaction.

In some exemplary embodiments, Software Component 332 may be configured to interact with components external to Device 330 via Obfuscated Interface Layer 331. Obfuscated Interface Layer 331 may comprise obfuscated external API. Device 330 may be configured to utilize Obfuscated Interface Layer 331 to communicate with Server 310. Device 320 and Device 330 may communicate with Server 310 using different keys.

In some exemplary embodiments, Operating System 336 may be configured to interact with Processor via an Obfuscated Interface Layer 337. Obfuscated Interface Layer 337 may comprise obfuscated ISA. Each obfuscated instruction of the obfuscated ISA may be generated by encrypting the original instruction using the key.

In some exemplary embodiments, components that are configured to interact via the interface layer may be provided directly with the key used to obfuscate the interface layer, to allow the components to utilize the obfuscated interface layer to interact with each other. The components may be configured to utilize the key to perform obfuscation and deobfuscation of the communication therebetween. In some exemplary embodiments, the key may be provided to a Hypervisor 338 installed on Device 330 to intermediate between Operating System 336 and Processor 339. Operating System 336 may be compiled to communicate with the server via Obfuscated Interface Layer 337 that comprises obfuscated ISA, while Processor 339 may be configured to execute non-obfuscated ISA. Hypervisor 338 may be configured to deobfuscate each obfuscated instruction executed by Operating System 336 via Obfuscated Interface Layer 337, before being invoked by Processor 339. In some exemplary embodiments, Hypervisor 338 may be a virtual machine that is configured to work with the obfuscated ISA. Hypervisor 338 may be provided with the key used to obfuscate the obfuscated ISA, such as by Server 310. Hypervisor 338 may be configured to utilize the key in order to perform the deobfuscation of the instructions. Additionally or alternatively, Hypervisor 338 may be provided with a conversion software that is configured to map each obfuscated instruction to the original instruction. The key may be embedded in conversion software and may or may not be provided directly to Hypervisor 338.

Figure 3C:
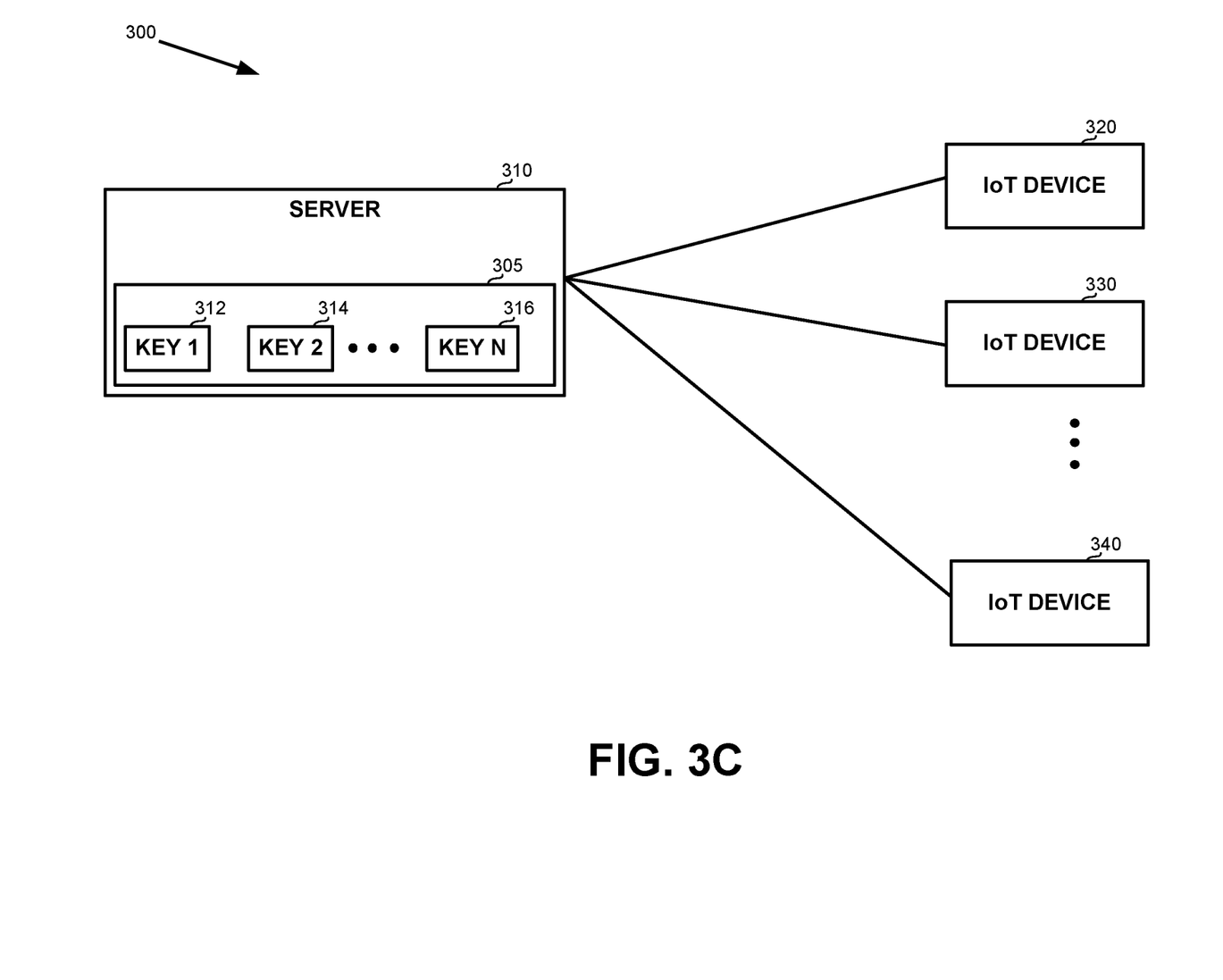

Referring now to FIG. 3C showing a schematic illustration of an exemplary environment and architecture in which the disclosed subject matter may be utilized, in accordance with some exemplary embodiments of the disclosed subject matter.

A system 300 may comprise a Server 310 and a plurality of devices, such as Device 320, Device 330 and Device 340. The plurality of devices may be configured to communicate with Server 310.

In some exemplary embodiments, the Server 310 may be coupled to a Memory 305 retaining a plurality of keys 312-316, each of which is associated with a device of the plurality of devices 320-340. As an example, Key 312 may be associated with Device 320.

In some exemplary embodiments, each key may be configured to represent a plurality of keys, each of which is associated with a different interface layer of the respective device. As an example, Key 312 may comprise 4 different keys, each of which is used to obfuscate a different interface layer of Device 320. e.g., a key associated with Obfuscated Interface Layer 322, a key associated with Obfuscated Interface Layer 324, a key associated with Obfuscated Interface Layer 326 and a key associated with Obfuscated Interface Layer 328. Key 312 may be an example, a concatenation of the four keys, a vector comprising the four keys, or the like.

In some exemplary embodiments, each device of the plurality of devices may be an instance of a same device. Each device of the plurality of devices may similar characteristics of the same device, that determine how the device is configured to operate. For example, the IoT devices may be different instances of a SENSIBO™ pod controlling an A/C device, different instances of a FITBIT™ bracelet monitoring the user, or the like.

The same device may comprise an interface layer utilized when communicating with Server 310. Each device of the plurality of devices may comprise, instead of the interface layer, an obfuscated interface layer that is obfuscated using the key that is associated with the device. As a result, the plurality of devices may perform a heterogeneous set of devices instead of a homogenous set of devices.

In some exemplary embodiments, Server 310 may be configured to communicate with each of the plurality of devices by retrieving the relevant key that is associated with the device from Memory 305; and obfuscating communication using the key to generate a communication compatible with the obfuscated interface layer of the device.

As an example, when communicating with Device 320, Server 310 may be configured to retrieve Key 312 from Memory 305. Server 310 may be configured to obfuscate the communication using Key 312. Device 320 and Server 310 may be configured to communicate via an obfuscated interface layer of Device 320 that may be s generated using Key 312. The obfuscated communication that is generated using Key 312, may be compatible with the obfuscated interface layer of Device 320.

In some exemplary embodiments, Server 310 may be configured to obfuscate the interface layer of each device of the plurality of devices to generate a unique obfuscated interface layer for each device. Server 310 may be configured to obfuscate the interface layer of the device using the key that is associated with the device.

In some exemplary embodiments, Server 310 may be configured to modify a component of the device in response to obfuscating the interface layer of the device, and generate a modified component. The component may be configured to utilize the interface layer. The modified component may be configured to utilize the obfuscated interface layer instead of the interface layer. Server 310 may be configured to provide the modified component to the device to be used by the device to communicate with Server 310 via the obfuscated interface layer.

Additionally or alternatively, the obfuscated interface layer of each device may be generated by a constituent of System 300 different that Server 310, an external constituent, or the like. The keys utilized to generate the obfuscated interface layers of the plurality of devices may be provided to Server 310 in order to allow the communication between Server 310 and the plurality of devices. Relevant components of the devices that are configured to utilize the interface layer may be updated to utilize the obfuscated interface layer, provided with the relevant key to enable on-the-fly obfuscation and deobfuscation, or the like.

Additionally or alternatively, Server 310 may be configured to obfuscate additional interface layers of the devices, that are not used directly to communicate with Server 310. As an example, Server 310 may generate Obfuscated Interface Layer 324 of Device 320 using Key 312. Server 310 may be configured to provide Obfuscated Interface Layer 324 to Device 320 to enable Software Component 323 and Software Component 325 to interact with each other.

In some exemplary embodiments, Server 310 may be configured to produce different obfuscated interface layers for different devices. As an example, the interface layer may comprise an ISA. Server 310 may generate different obfuscated interface layers to comprise different ISAs. As a result, a program executable by one device may not be executable by another device in view of a usage of a different ISA.

In some exemplary embodiments, Server 310 may be configured to manage communications between the plurality of devices. Server 310 may be configured to enable the communication between the plurality of devices without risking the devices. Server 310 may be configured to verify that each communication between two devices is safe. Server 310 may be the only party that the devices are allowed to directly communicate with.

As an example, Server 310 may be configured to receive a communication directed from Device 320 to Device 330. Server 310 may be configured to enable the communication between Device 320 and Device 330, without exposing the key of each device to the other, or uncovering the obfuscation. Server 310 may be configured to retrieve Key 312 that is associated with Device 320, and Key 314 that is associated with Device 330 from Memory 305. Server 310 may be configured to receive the communication from Device 320, via an interface layer that is obfuscated using Key 312. Server 310 may be configured to deobfuscate the communication using Key 312, and re-obfuscate the deobfuscated communication using Key 314. Server 310 may be configured to transmit the obfuscated communication to Device 330 via an interface layer that is obfuscated using Key 314. As a result, only communications that are performed through Server 310 may be correctly received by the plurality of devices. Communications that are not obfuscated using the correct keys, which may be retained only be Server 310, may not be correctly received by the devices.

Additionally or alternatively, Server 310 may be configured to manage communications from external sources with the plurality of devices. Server 310 may be configured to verify that the requested communication is allowed. Server 310 may be the only party that is able to directly communicate with the devices. Each communication with a device of the plurality of devices may be performed through Server 310.

As an example, Server 310 may be configured to receive a communication request directed to Device 320. Server 310 may be configured to retrieve Key 312 that is associated with Device 320 from Memory 305. Server 310 may be configured to obfuscate the communication using Key 312. Server 310 may be configured to communicate with Device 320 using Key 312, and provide the obfuscated communication thereto.

In some exemplary embodiments, Server 310 may be configured to install applications on the plurality of devices. As an example, Server 310 may be configured to install an application on Device 320. Server 310 may be configured to retrieve the obfuscation keys of all the obfuscated interface layers of Device 320. The obfuscation keys may be obtainable from Key 312. Server 310 may be configured to compile the application according to the obfuscation keys. Server 310 may be further configured to obfuscate the install request according to Key 312 (or a portion thereof may be used for the communication with Device 320). Server 310 may send the obfuscated install request to Device 320.

Figure 4:
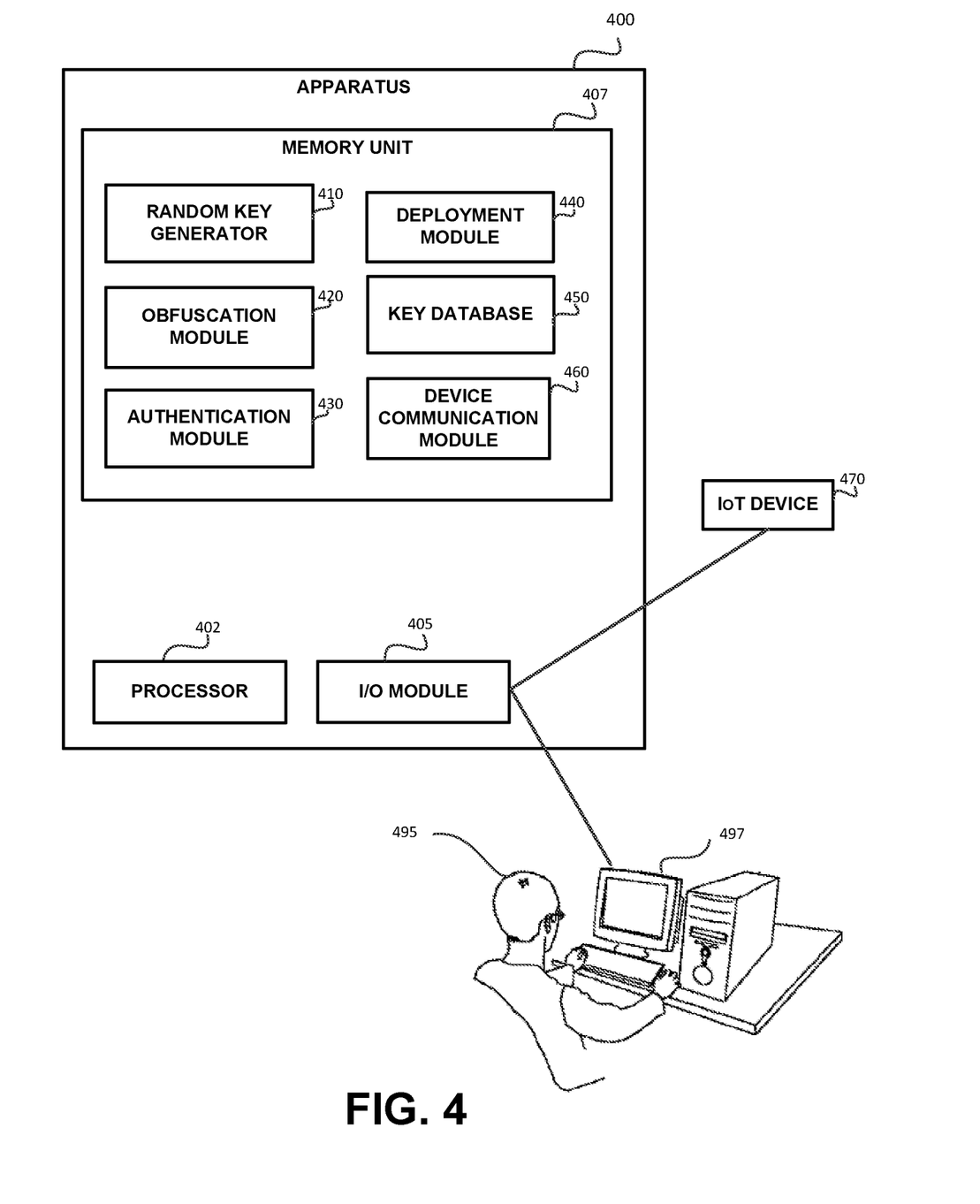
FIG. 4 shows a block diagram of an apparatus, in accordance with some exemplary embodiments of the disclosed subject matter.

Referring now to FIG. 4 showing a block diagram of an apparatus, in accordance with some exemplary embodiments of the disclosed subject matter. An Apparatus 200 may be configured to support parallel user interaction with a real world physical system and a digital representation thereof, in accordance with the disclosed subject matter.

In some exemplary embodiments, an Apparatus 400 may comprise one or more Processor(s) 402. Processor 402 may be a Central Processing Unit (CPU), a microprocessor, an electronic circuit, an Integrated Circuit (IC) or the like. Processor 402 may be utilized to perform computations required by Apparatus 400 or any of it subcomponents.

In some exemplary embodiments of the disclosed subject matter, Apparatus 400 may comprise an Input/Output (I/O) Module 405. I/O Module 405 may be utilized to provide an output to and receive input from a user, such as, for example obtaining keys or credential from users, sending obfuscation messages to devices and receiving responses therefrom, or the like.

In some exemplary embodiments, Apparatus 400 may comprise a Memory 407. Memory 407 may be a hard disk drive, a Flash disk, a Random Access Memory (RAM), a memory chip, or the like. In some exemplary embodiments, Memory 407 may retain program code operative to cause Processor 402 to perform acts associated with any of the subcomponents of Apparatus 400.

In some exemplary embodiments, an IoT Device 470 may be configured to execute a computer program product. IoT Device 470 may be configured to execute two component that at least one of the two components is part of the computer program product. The two components may be configured to interact with each other via an interface layer, such as an IS), a set of functions of an operating system of the device, an assembly instruction set, and an API, or the like. Additionally or alternatively, IoT Device 470 may be configured to interact with Apparatus 400 via a second interface layer, such as an external API.

In some exemplary embodiments, Random Key Generator 410 may be configured to generate a key for a device, such as IoT Device 470. Random Key Generator 410 may be configured to generate different keys for different devices. Random Key Generator 410 may be configured to generate the keys based on credentials provided by a User 495, an administrator, or the like.

In some exemplary embodiments, keys generated by Random Key Generator 410 may be retained in a Key Database 450. Key Database 450 may be configured to retain keys that are associated with a different devices managed by Apparatus 400, devices configured to interact with Apparatus 400, or the like. Additionally or alternatively, Key Database 450 may be configured to retain a different key for each different interface layer on each device.

In some exemplary embodiments, Obfuscation Module 420 may be configured to obfuscate interface layers utilized by components of devices to interact therebetween, to interact with Apparatus 400, to interact with other devices, or the like. Obfuscation Module 420 may be configured to obfuscate the interface layers based on keys associated with the interface layers or their devices.

As an example, IoT Device 470 may be configured to execute a computer program product. A component of computer program product may be configured utilize an interface layer to interact to interact with each other via an interface layer. Obfuscation Module 420 may be configured to obfuscate the interface layer using the key obtained or generated for Device 470.

In some exemplary embodiments, Deployment Module 440 may be configured to deploy the obfuscated interface layers in devices that are supposed to utilize the obfuscated interface layers, such as IoT Device 470. In some exemplary embodiments, Deployment Module 440 may be configured to compile components of the devices with the obfuscated interface layers. Additionally or alternatively, Deployment Module 440 may be configured to provide the relevant key to the components and the components may be configured to perform obfuscation or deobfuscation on the fly of the interface layer to utilize the obfuscated interface layer.

In some exemplary embodiments, an Authentication Module 430 may be configured to determine whether a device is authenticated or not. Authentication Module 430 may be configured to sending an authentication massage to a device, such as IoT Device 470. The authentication massage may comprise program instructions that are configured to utilize the obfuscated interface layer of the device. When executing the program instructions a predetermined outcome may be expected. The predetermined outcome may be generated only by devices that have the obfuscated interface layer, or the relevant key, e.g. authenticated devices.

Authentication Module 430 may be configured to obtain a response from the device, such as via I/O Module 405. The response may comprise an outcome of executing the program instructions by the device.

Authentication Module 430 may be configured to compare the outcome to the predetermined outcome. Authentication Module 430 may be configured to authenticate the device based on the outcome and the predetermined outcome being identical.

In some exemplary embodiments, Device Communication Module 460 may be configured to manage inter-device communication. Given a request from a first device to send data to a second device, Device Communication Module 460 may be configured to verify that the communication is allowed between the two devices. Device Communication Module 460 may be configured to obtain the request from the first device via I/O Module 405. Device Communication Module 460 may be configured to retrieve the key associated with the first device from Key Database 450 in order to receive the communication transmitted by the first device. Device Communication Module 460 may utilize Obfuscation Module 420 to deobfuscate the communication transmitted by the first device. Device Communication Module 460 may be configured to retrieve the key associated with the second device from Key Database 450. Device Communication Module 460 may be configured to obfuscate the communication using the key of the second device. Device Communication Module 460 may be configured to utilize Obfuscation Module 420 to obfuscate the message before being transmitted to the second device. Additionally or alternatively, Obfuscation Module 420 may be configured to provide the communication to the second device via an obfuscated layer utilized for the communication between Apparatus 400 and the second device.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
obtaining a key for a device, wherein the device is an instance of a single device, whereby different keys are obtained for different instances of the single device, wherein the device is configured to execute a computer program product, wherein the device is configured to execute two components, wherein at least one of the two components is part of the computer program product, wherein the two components are configured to interact with each other via an interface layer;
obfuscating the interface layer using the key, whereby producing an obfuscated interface layer;
providing, directly or indirectly, the two components with the key to allow the two components to utilize the obfuscated interface layer to interact with each other, instead of the interface layer;
obtaining a second key for a second device, wherein the second device is an instance of the single device, wherein the first key is different than the second key, wherein the device is configured to communicate with the second device via a second interface layer;
obfuscating the second interface layer using the second key, whereby producing a second obfuscated interface layer of the second device; and
modifying a component of the second device to utilize the second obfuscated interface layer of the second device instead of the second interface layer, whereby obtaining a modified component.

2. The method of claim 1, wherein the interface layer and the second interface layer are selected from the group consisting of: an Instruction Set Architecture (ISA), a set of functions of an operating system of the device, an assembly instruction set, and a set of addresses of invocable gadgets.

3. The method of claim 1 further comprising:
obfuscating a third interface layer using a third key, wherein the third interface layer is utilized by a first component executed by the device and a second component to interact with each other, whereby producing a third obfuscated interface layer, wherein the first component and the second component are different than the two components;
providing, directly or indirectly, the first and the second components with the third key to allow the first and the second components to utilize the third obfuscated interface layer to interact with each other.

4. The method of claim 3, wherein the third key is the key.

5. The method of claim 3, wherein the second component is external to the device, wherein the second component and the first component communicate over a network, wherein the second component is configured to communicate with other devices, wherein the second component is configured to utilize a different key to communicate with each different device.

6. The method of claim 1 further comprising:
compiling at least one of the two components with the obfuscated interface layer.

7. The method of claim 1, wherein at least one of the two components is configured to retrieve the key and perform obfuscation or deobfuscation on the fly of the interface layer, whereby the at least one of the two components is enabled to utilize the obfuscated interface layer.

8. The method of claim 1 further comprising:
authenticating the device, wherein said authenticating comprises:
sending an authentication massage to the device, wherein the authentication massage comprises program instructions utilizing the obfuscated interface layer, wherein upon executing the program instructions a predetermined outcome is expected;
obtaining a response from the device, wherein the response comprises an outcome of executing the program instructions by the device;
comparing the outcome to the predetermined outcome; and
authenticating the device based on the outcome and the predetermined outcome being identical.

9. A system comprising:
a server, wherein said server is coupled to a memory retaining a plurality of keys, wherein each key is associated with a different device of a plurality of devices; and
said plurality of devices is configured to communicate with said server; wherein each device of said plurality of devices is an instance of a same device, wherein the same device comprises an interface layer utilized when communicating with said server;
wherein said each device comprises, instead of the interface layer, an obfuscated interface layer that is obfuscated using a key comprised by the plurality of keys and that is associated with said each device, whereby providing a heterogeneous set of devices instead of a homogenous set of devices,
wherein said server is configured to communicate with a second device of the plurality of devices by retrieving a second key associated with said second device from said memory and obfuscating communication using said second key to generate a communication compatible with an obfuscated interface layer of said second device;
wherein said server is further configured to:
obfuscate the interface layer using a third key associated with a third device of said plurality of devices, whereby generating an obfuscated interface layer of said third device;
modify a component of said third device to utilize the obfuscated interface layer of said third device instead of the interface layer, whereby obtaining a modified component; and
provide the modified component to said third device to be used by said third device.

10. The system of claim 9, wherein said third device of said plurality of devices is configured to execute a pair of components, wherein the pair of components are configured to interact with each other via a second interface layer, wherein the second interface layer is obfuscated by said server to produce a second obfuscated interface layer, wherein the second obfuscated interface layer is produced using a third key associated with said third device, wherein said third key is comprised by the plurality of keys, wherein said server is configured to provide the second obfuscated interface layer to said third device, whereby enabling the pair of components to interact with each other via the second obfuscated interface layer.

11. The system of claim 9, wherein the interface layer comprises an obfuscated Instruction Set Architecture (ISA) of the same device, wherein said server is configured to produce different obfuscated interface layers for different devices of said plurality of devices, wherein different obfuscated interface layers comprise different ISAs, whereby a program executable by one device of said plurality of devices is not executable by another device of said plurality of devices in view of a usage of a different ISA.

12. A computer program product comprising a non-transitory computer readable storage medium retaining program instructions, which program instructions when read by a processor, cause the processor to perform a method comprising:
   obtaining a key for a device, wherein the device is an instance of a single device, whereby different keys are obtained for different instances of the single device, wherein the device is configured to execute a computer program product, wherein the device is configured to execute two components, wherein at least one of the two components is part of the computer program product, wherein the two components are configured to interact with each other via an interface layer;
   obfuscating the interface layer using the key, whereby producing an obfuscated interface layer;
   providing, directly or indirectly, the two components with the key to allow the two components to utilize the obfuscated interface layer to interact with each other, instead of the interface layer;
   obtaining a second key for a second device, wherein the second device is an instance of the single device, wherein the first key is different than the second key, wherein the device is configured to communicate with the second device via a second interface layer;
   obfuscating the second interface layer using the second key, whereby producing a second obfuscated interface layer of the second device; and
   modifying a component of the second device to utilize the second obfuscated interface layer of the second device instead of the second interface layer, whereby obtaining a modified component.

13. The computer program product of claim 12, wherein the interface layer and the second interface layer are selected from the group consisting of: an Instruction Set Architecture (ISA), a set of functions of an operating system of the device, an assembly instruction set, and a set of addresses of invocable gadgets.

14. The computer program product of claim 12, wherein said method further comprising:
   obfuscating a third interface layer using a third key, wherein the third interface layer is utilized by a first component executed by the device and a second component to interact with each other, whereby producing a third obfuscated interface layer;
   providing, directly or indirectly, the first and the second components with the third key to allow the first and the second components to utilize the third obfuscated interface layer to interact with each other.

15. The computer program product of claim 14, wherein the second component is external to the device, wherein the second component and the first component communicate over a network, wherein the second component is configured to communicate with other devices, wherein the second component is configured to utilize a different key to communicate with each different device.

16. The computer program product of claim 12, wherein said method further comprising:
   compiling at least one of the two components with the obfuscated interface layer.

17. The computer program product of claim 12, wherein at least one of the two components is configured to retrieve the key and perform obfuscation or deobfuscation on the fly of the interface layer, whereby the at least one of the two components is enabled to utilize the obfuscated interface layer.

18. The computer program product of claim 12, wherein said method further comprising:
   authenticating the device, wherein said authenticating comprises:
   sending an authentication massage to the device, wherein the authentication massage comprises program instructions utilizing the obfuscated interface layer, wherein upon executing the program instructions a predetermined outcome is expected;
   obtaining a response from the device, wherein the response comprises an outcome of executing the program instructions by the device;
   comparing the outcome to the predetermined outcome; and
   authenticating the device based on the outcome and the predetermined outcome being identical.

19. An apparatus comprising a processor and a memory storing computer executable instructions, that when executed by the processor, cause the processor to perform the method of claim 1.

* * * * *